(12) United States Patent
Robinson

(10) Patent No.: US 12,328,210 B1
(45) Date of Patent: Jun. 10, 2025

(54) METHODS AND APPARATUS FOR SIGNAL CORRELATION USING A QUADRATIC FORM

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 421 days.

(21) Appl. No.: 17/956,742

(22) Filed: Sep. 29, 2022

Related U.S. Application Data

(60) Provisional application No. 63/252,761, filed on Oct. 6, 2021.

(51) Int. Cl.
H04L 25/03 (2006.01)

(52) U.S. Cl.
CPC .............................. *H04L 25/03165* (2013.01)

(58) Field of Classification Search
CPC ................................................ H04L 25/03165
USPC ....................................................... 455/63.1
See application file for complete search history.

(56) References Cited

U.S. PATENT DOCUMENTS

| | | | |
|---|---|---|---|
| 10,728,081 B1 * | 7/2020 | Sandell | ............... H04L 27/3863 |
| 11,310,030 B2 | 4/2022 | De Hoogh et al. | |
| 11,334,807 B1 * | 5/2022 | O'Shea | ................. G06N 20/00 |
| 2004/0101048 A1 | 5/2004 | Paris | |
| 2007/0097856 A1 | 5/2007 | Wang et al. | |
| 2011/0060917 A1 | 3/2011 | Troncoso Pastoriza et al. | |
| 2013/0216044 A1 | 8/2013 | Gentry et al. | |
| 2015/0110269 A1 | 4/2015 | Ohya et al. | |
| 2018/0276014 A1 | 9/2018 | Kliuchnikov et al. | |
| 2018/0332147 A1 | 11/2018 | Park et al. | |
| 2018/0365975 A1 * | 12/2018 | Xu | ....................... G08B 29/185 |
| 2022/0255728 A1 | 8/2022 | Robinson et al. | |
| 2022/0382521 A1 | 12/2022 | Krcmaricic-Barackov et al. | |

FOREIGN PATENT DOCUMENTS

| | | | |
|---|---|---|---|
| EP | 1133097 A1 | 9/2001 | |
| WO | WO-2022173919 A1 | 8/2022 | |

OTHER PUBLICATIONS

International Search Report and Written Opinion for Application No. PCT/US2022/015938, mailed on May 17, 2022, 14 pages.

(Continued)

*Primary Examiner* — Don N Vo

(57) ABSTRACT

A method for training a machine learning (ML) model to perform signal detection to correct a carrier frequency offset associated with a signal includes training a machine learning (ML) model associated with a receiver, based on (1) data including a plurality of different carrier frequency offset values, (2) a matched filter, and (3) a linear transformation matrix, to produce a trained ML model. A signal is received at the receiver, the signal having an associated carrier frequency offset that is not known to the receiver at the time the signal is received. The method also includes identifying, at the receiver and using the trained ML model, the carrier frequency offset of the signal, and correcting the carrier frequency offset of the signal to identify a message encoded by the signal.

20 Claims, 5 Drawing Sheets

(56) References Cited

OTHER PUBLICATIONS

Wahab, Hala B. Abdul, et al., "Using Unitary Matrices in High-speed Video Encryption", International Journal of Computer Science and Network Security (IJCSNS) (Jun. 1, 2015); 15(6): 92-95.
Non-Final Office Action for U.S. Appl. No. 17/668,876 dated Jun. 23, 2023, 14 pages.
International Preliminary Report on Patentability for International Application No. PCT/US2022/015938, mailed Aug. 24, 2023, 8 pages.

* cited by examiner

METHODS AND APPARATUS FOR SIGNAL CORRELATION USING A QUADRATIC FORM

CROSS-REFERENCE TO RELATED APPLICATIONS

This application claims priority to and the benefit of U.S. Provisional Patent Application No. 63/252,761, filed Oct. 6, 2021 and titled "METHODS AND APPARATUS FOR SIGNAL CORRELATION USING A QUADRATIC FORM," the contents of which are incorporated by reference herein in their entirety.

This application is related to U.S. Patent Application Publication Number 2022/0255728, published Aug. 11, 2022 and titled "Automorphic Transformations of Real and Complex Signal Samples within a Transmitter or Receiver," the disclosure of which is incorporated by reference herein in its entirety.

FIELD

The present disclosure relates to signal processing for communication systems, and more specifically, to measuring various properties of a signal, to measuring various types of distortions, including noise, synchronization errors, timing and frequency offsets, channel errors, interference, and to correcting those errors.

BACKGROUND

The concept of correlation, in general, relates to quantifying the similarity between two signals. Correlation can be between spatial, temporal, or spectral properties of a signal.

SUMMARY

In some embodiments, a method for performing signal detection, in which a carrier frequency offset associated with a signal is corrected, includes one of: (1) training a machine learning (ML) model associated with a receiver, based on (i) data including a plurality of different carrier frequency offset values, (ii) a matched filter, and (ii) a linear transformation matrix, to produce a trained ML model, or (2) receiving the trained ML model at the receiver and from a remote compute device. A signal is received at the receiver, the signal having an associated carrier frequency offset that is not known to the receiver at the time the signal is received. The method also includes identifying, at the receiver and using the trained ML model, the carrier frequency offset of the signal, and correcting the carrier frequency offset of the signal to identify a message encoded by the signal.

In some embodiments, a method for training a ML model to perform signal detection and to equalize channel distortion associated with a signal includes training a machine learning (ML) model associated with a receiver, based on (1) a plurality of different channel distortions, (2) a matched filter, and (3) one of a Toeplitz matrix or a circulant matrix, to produce a trained ML model. The method also includes receiving a signal at the receiver, the signal having an associated channel distortion that is not known to the receiver at the time the signal is received. The channel distortion of the signal is detected at the receiver, using the trained ML model, and the channel distortion of the signal is equalized such that a message encoded by the signal can be identified.

In some embodiments, a method for training a ML model to perform signal detection and to remove the effects of an interfering signal from a received signal includes training a machine learning (ML) model associated with a receiver, based on (1) a plurality of different time-dependent narrow-band basis vectors, and (2) a matched filter, to produce a trained ML model. A signal is received at the receiver, the signal having an associated interfering signal that is not known to the receiver at the time the signal is received. The interfering signal associated with the signal is identified, at the receiver and using the trained ML model, and the interfering signal is subtracted from the signal to identify a message encoded by the signal.

DETAILED DESCRIPTION

Figure 1:
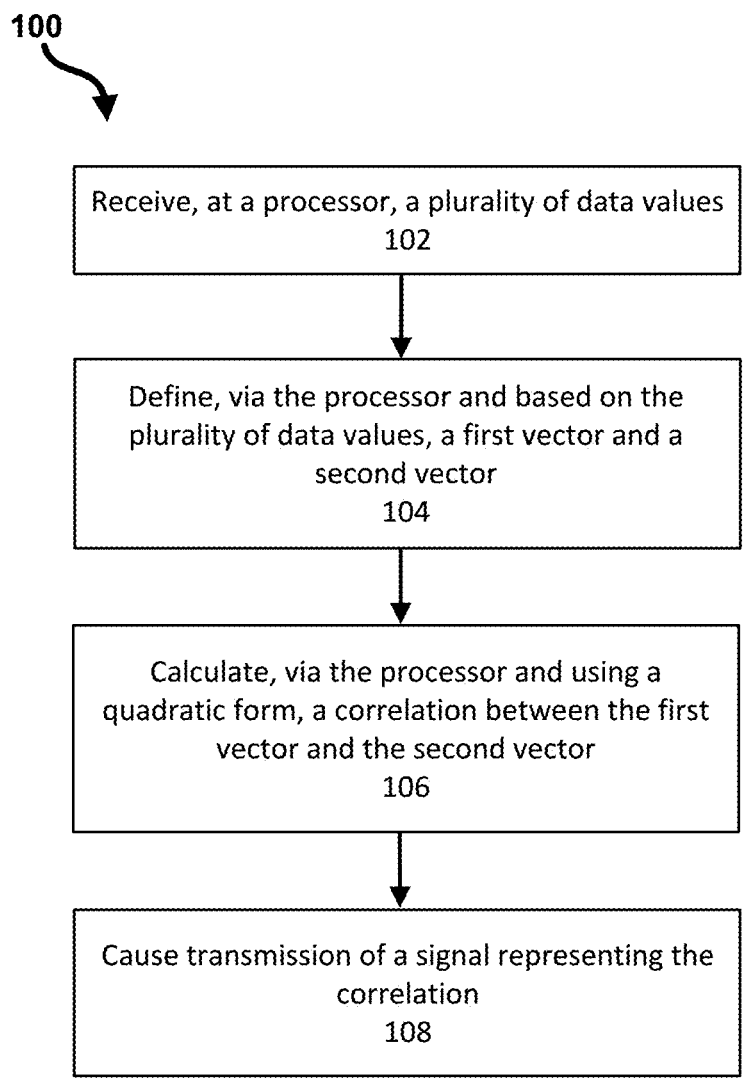
FIG. 1 is a flowchart illustrating a method for performing a correlation between for a pair of vectors using a quadratic form, according to an embodiment.

Correlations are a fundamental tool in signal processing. Broadly speaking, correlation is a measurement of how related two random variables are. In signal processing, linear, time-invariant systems are of particular interest, and as such, are often restricted to linear correlations/relationships between different data sets. The different data sets may be two different sequences (cross-correlation), or different subsets of the same data (auto-correlation). As discussed herein, the term "correlation" can refer to any of the foregoing.

Correlation can be applied in several ways during signal processing. For example, correlation can be used to identify or detect certain key portions of a signal (e.g., a beginning of a frame, an end of a frame, etc.), or to measure various types of distortions, such as carrier frequency offset, sample frequency offset, timing offset, channel distortion, etc. Often, such correlations take the form of a dot product between different components of the signal. For example, a first component of a given signal may include a first list of N samples (denoted v) and a second list of N samples (denoted w). Depending on the implementation, a first list of N samples and a second list of N samples may be from the same (i.e., a common) signal or from different signals. The correlation is proportional to the dot product $\vec{v}^\dagger \cdot \vec{w}$, or is proportional to the conjugate of the dot product $\vec{v}^\dagger \cdot \vec{w}$. The $\dagger$ refers to a conjugate transpose, and may be replaced by a 'simple transpose' T.

Many useful operations are carried out in the foregoing manner. It is possible, however, to generalize beyond known forms, and doing so may be beneficial, for example because systems are increasingly reliant upon machine learning algorithms for mitigating various distortions. Providing such algorithms with a larger search space, as discussed herein, can facilitate improved performance (e.g., processing/computational speed) and greater accuracy. In other words, by configuring a computer to seek optimal solutions from within a larger space of possible solutions (i.e., an increased solution space) can result in better solutions being identified for error measurement and/or error correction activities such as correcting time/frequency offsets, correcting channel distortions, noise mitigation, interference rejection, etc.

In some embodiments, the general form of the correlation $\bar{v}^\dagger \cdot \bar{w}$ is considered as a linear map, and is replaced with $\bar{v}^\dagger \cdot I \cdot \bar{w}$ (without changing the meaning), where I represents the identity matrix. More explicitly, the foregoing can be written as:

$$(v_1^* \ v_2^* \ v_3^* \ \ldots) \begin{pmatrix} 1 & 0 & 0 & 0 & \ldots \\ 0 & 1 & 0 & 0 & \ldots \\ 0 & 0 & 1 & 0 & \ldots \\ 0 & 0 & 0 & 1 & \ldots \\ \vdots & \vdots & \vdots & \vdots & \ddots \end{pmatrix} \begin{pmatrix} w_1 \\ w_2 \\ w_3 \\ \vdots \end{pmatrix}, \quad (1)$$

where the * denotes a complex conjugate. Replacing the identity matrix with a more general linear transformation changes the above expression to a transformed expression:

$$\bar{v}^\dagger A \bar{w} = (v_1^* \ v_2^* \ v_3^* \ \ldots) \begin{pmatrix} a_{11} & a_{12} & a_{13} & a_{14} & \ldots \\ a_{21} & a_{22} & a_{23} & a_{24} & \ldots \\ a_{31} & a_{32} & a_{33} & a_{34} & \ldots \\ a_{41} & a_{42} & a_{43} & a_{44} & \ldots \\ \vdots & \vdots & \vdots & \vdots & \ddots \end{pmatrix} \begin{pmatrix} w_1 \\ w_2 \\ w_3 \\ \vdots \end{pmatrix}, \quad (2)$$

where the a values are elements of the linear transformation matrix.

Written a different way, the transformed expression (2) can be expressed as:

$$\text{corr}\ (\bar{v}, \bar{w}) \equiv \sum_{i,j=1}^{N} a_{ij} v_i^* w_j \quad (3)$$

Written this way, the correlation operation/function is expressed as a quadratic form between the components of $v^\dagger$ and $\bar{w}$. It is possible to define the correlation with the complex conjugate on either of the elements, both of the elements, or neither of the elements.

More formally, a quadratic form over a field K is a map q: V→K from a finite dimensional K vector space such that $q(\alpha v) = \alpha^2 q(v)$ for all $\alpha \in K$, $v \in V$, and such that the function $q(u+v) - q(u) - q(v)$ is bilinear.

More concretely, an N-ary quadratic form over a field K is a homogeneous polynomial of degree 2 in N variables with coefficients in K:

$$q(x_1, x_2, \ldots, x_N) = \sum_{i=1}^{N} \sum_{j=1}^{N} a_{ij} x_i x_j \quad a_{ij} \in K \quad (4)$$

Broadening the definition of correlation to this generalized quadratic form version can provide a machine learning algorithm with an improved search space over which to both estimate error parameters and find solutions. Methods set forth herein can be compatible with a variety of machine learning systems and processes, including but not limited to, probabilistic classifier algorithms (e.g., naïve Bayes classifiers), k-prototype algorithms, k-means clustering algorithms, k-mode clustering algorithms, supervised learning methods (e.g., support-vector machines), linear model generation, regression (e.g., linear regression), neural networks, decision/classification trees, nearest neighbor algorithms, particle swarm optimization (PSO), and genetic algorithms.

Consider a transmitter that transmits the following (ideal) in-phase/quadrature (I/Q) points:

$$(z_0, z_1, z_2, z_3, z_4, z_5, \ldots) \quad (5)$$

Ignoring the effects of noise, multipath, and other errors, and focusing exclusively on a carrier frequency offset, the receiver will recover a signal distorted in the following way:

$$(e^{i\phi} z_0, e^{i(\theta+\phi)} z_1, e^{i(2\theta+\phi)} z_2, e^{i(3\theta+\phi)} z_3, e^{i(4\theta+\phi)} z_4, \ldots) \quad (6)$$

where $\theta$ and $\phi$ are values that depend on the actual value of the carrier frequency offset. More generally, it can be stated that the sample $z_n$ is distorted by a unit complex number with argument $n\theta + \phi$, or:

$$z_n \to e^{i(n\theta+\phi)} z_n. \quad (7)$$

The foregoing distortion can be problematic, for example, when a receiver tries to detect a block using a matched filter or a local replica of the known sequence. For example, suppose that the known sequence has length N and is given by $z = (z_0, z_1, \ldots, z_{N-1})$. Typically, the receiver would correlate the received signal with the complex conjugate of this known sequence, so that when the signals are aligned, the value is:

$$(z^*_0, z^*_1, \ldots, z^*_{N-1}) \cdot (z_0, z_1, \ldots, z_{N-1}) = \bar{z}^\dagger \cdot \bar{z} = |\bar{z}|^2. \quad (8)$$

When the receiver is not aligned with the transmitted sequence, this correlation/dot-product will be taken with random noise, or a different sequence, and the value will in general be much smaller than $|\bar{z}|^2$. The ability to correlate and identify when the correlation suddenly becomes large is therefore desirable in signal detection.

When there is a carrier frequency offset, however, and the samples are distorted as in (7), then the correlation becomes:

$$(z_0^*, z_1^*, \ldots, z_{N-1}^*) \cdot \left( e^{i\phi} z_0, e^{i(\theta+\phi)} z_1, e^{i((N-1)\theta+\phi)} \ldots, z_{N-1} \right) = e^{i\phi} \bar{z}^\dagger \cdot D_\theta \cdot \bar{z}, \quad (9)$$

$$= e^{i\phi} \sum_{n=0}^{N-1} e^{in\theta} z_n^* z_n$$

$$= e^{i\phi} \sum_{n=0}^{N-1} e^{in\theta} |z_n|^2.$$

The value $D_\theta$ is an N×N diagonal unitary matrix with entries $e^{in\theta}$ for $n \in [0, N)$.) The #component does not impact the overall magnitude, and thus does not hinder the receiver's ability to detect this sequence, however the $\theta$ component does impact the overall magnitude. Note that the $\theta$ values can cause the magnitude to "curl" around back towards the origin, so that the resulting number can take any value between 0 and $|\bar{z}|^2$. This can be detrimental to the receiver's ability to detect the signal.

In the presence of carrier frequency offsets, attempts to correlate with the known sequence can be unsuccessful. Moreover, when training artificial intelligence (AI)/machine learning (ML) models to detect sequences, using the known sequence H and not any other variables, the AI/ML models do not have access to, and thus cannot explore, exploit, or leverage, any regions of parameter space that could detect the sequence.

According to some embodiments of the present disclosure, when training AI/ML models, an additional element can be added to the parameter space over which the AI/ML models are trying to optimize. Namely, by providing the AI/ML models with the opportunity to train on data with various carrier frequency offset values, allowing the AI/ML models to train using not only the local replica $\bar{z}$, but also a new variable a (a free parameter that the machine learning algorithm with seek to optimize), and letting the AI/ML models train using the value $D_\alpha - z$ (where $D_\alpha$ is defined as in the first line of (9)), then the AI/ML models are able to explore, exploit, or leverage the parameter space that would allow detection of the signal. In this case, the $D_\alpha$ values are the $a_{mn}$ values (elements of a linear transformation matrix) discussed below.

Note that the $\alpha$ may be introduced to help mitigate the $\theta$ distortion above. In some embodiments, the $\phi$ distortion does not impact the ability of the receiver to detect/recover the signal, and thus no additional term (e.g., "$\beta$") is introduced to mitigate the $\phi$ distortion discussed above. By introducing a single parameter $\alpha$ and building a new correlator, the AI/ML has the opportunity to learn how to use a matched filter to search for a sequence with an unknown frequency offset. In other embodiments, however, an additional term "$\beta$" may be introduced to mitigate the $\phi$ distortion.

Consider a machine learning model trained with the correlator defined by:

$$a_{mn} = \delta_{mn}(e^{i\alpha})_m, \quad (10)$$

where $\delta_{mn}$ is the Kronecker delta, $a_{mn}$ are elements of a linear transformation matrix, and a is a free parameter that the machine learning model will seek to optimize. With appropriate training data, the form shown in (10) allows the machine learning model to detect, estimate, and correct a carrier frequency offset.

As another example, let the $a_{mn}$ values take on a Toeplitz form or a circulant form. Such a modification can allow the machine learning algorithm to estimate and correct for channel distortion. Consider a transmitter that transmits the following (ideal) I/Q points:

$$\bar{z} = (z_0, z_1, z_2, z_3, z_4, z_5, \ldots) \quad (11)$$

Ignoring the effects of noise, multipath, and other errors, and focusing exclusively on channel/multipath distortion, the receiver will recover a signal distorted in the following way:

$$\bar{r} = \bar{h} * \bar{z}, \quad (12)$$

where * denotes linear convolution, and $\bar{h}$ is the set of channel "taps," corresponding to different reflections/bounces/delayed echoes of the signal in the environment.

If a cyclic prefix is used on blocks of the signal, then (12) becomes:

$$\bar{r} = \bar{h} \circledast \bar{z}, \quad (13)$$

where $\circledast$ denotes the circular convolution on the block to which the cyclic prefix was applied. This circular convolution can be applied separately to each cyclically prefixed block of the signal.

Consider again the case of a known length-N sequence $(z_0, z_1, \ldots, z_{N-1})$ that is transmitted, and a receiver that is trying to detect it using a matched filter with a local replica. If the signal has been distorted as in (12) or (13), then the correlations will be between z and $\bar{h}*\bar{z}$ or between $\bar{z}$ and $h \circledast \bar{h}$. Depending on the severity of h, this could impair the detector's ability to accurately detect/recover the signal. Moreover, when training AI/ML to detect sequences, using the known sequence $\bar{z}$, the AI/ML models do not have access to, and thus cannot explore, exploit, or leverage, any regions of the associated parameter space that could detect the sequence.

According to some embodiments of the present disclosure, when using machine learning to train, the $a_{mn}$ values can be selected to be either a Toeplitz matrix or a circulant matrix, e.g., depending on whether or not a cyclic prefix is used. The distortion in (12) and (13) are Toeplitz and circulant, respectively, so matrices of the same form are understood to be best suited to "undo" the impairments caused by the distortion.

By implementing methods set forth herein, according to some embodiments, AI/ML can be used to effectively equalize out the distortions of linear or circular convolution(s), and the AI/ML has the flexibility to optimally detect using the local replica by exploring, exploiting, or leveraging the parameter space that would allow detection of the signal. In other words, the AI/ML has the opportunity to learn how to build a matched filter to search for a sequence with channel/multipath distortion.

As yet another example, let the $a_{mn}$ values take the form of a linear combination of different matrices, thereby equipping the machine learning algorithm to measure and remove an interfering signal. Consider a signal transmitted with a sequence $\bar{z}$ that is known to the receiver (as discussed in the preceding two examples), and an interfering signal that has at least a portion in the same bandwidth as the transmitted signal. The receiver will receive $\bar{z} + \bar{s}$, where $\bar{s}$ is the interferer. Assume that the bandwidth of $\bar{s}$ is much less than the bandwidth of $\bar{z}$.

If the receiver attempts to detect the presence of the known sequence $\bar{z}$, then the correlation with the local replica will result (on alignment) in $|\bar{z}|^2 + \bar{z}^\dagger \cdot s$. Depending on the severity of the interferer s, this could impair the detector's ability to accurately detect and/or process the signal of the known sequence, even if detection is done perfectly.

In some embodiments, the $a_{mn}$ values discussed above are defined as including a collection of time-dependent narrowband basis vectors, e.g., a Shannon-Whittaker basis covering narrow band bins across the bandwidth of the signal of interest. In other words, the $a_{mn}$ values can be promoted as follows. At each time k, a linear combination of Shannon-Whittaker basis elements is desired, for cancelling out the effects of an interferer, and thus it is desirable to allow the AI/ML to determine/learn the coefficients of the linear combination. Denoting a basis vector centered at frequency bin m as $\bar{\lambda}_m$, and its time-domain samples as $\lambda_m$, a linear combination of these values can be constructed as:

$$a_{mn} = \sum_{l=0}^{N-1} \alpha_{ml} \lambda_{ln} \quad (14)$$

for some coefficients $\alpha_{ml}$ that can be learned by the AI/ML. These coefficients can also be made time dependent, so that they become:

$$a(k)_{mn} = \sum_{l=0}^{N-1} \alpha(k)_{ml} \lambda_{ln} \quad (15)$$

for every time k. In this manner, the AI/ML is given a chance to learn and effectively subtract out the distortions caused by an interfering narrowband signal.

As yet another example, the values of $a_{mn}$ can be chosen with known prior distributions of various radar-related use-cases, thereby allowing a machine learning algorithm to more quickly and efficiently identify objects. Applications for such implementations include, but are not limited to: weather tracking, air-traffic control, navigation, and geological applications.

Generalizations described herein, according to some embodiments, can also facilitate the extraction of a signal from noise (e.g., for narrow-band internet-of-things (IoT) applications, or for nodes in a power/resource constrained environment, or where a distance between systems is initially unknown) by permitting the correlator to use a more general quadratic form to account for a variety of noise models (including potentially non-white/Gaussian noise) or other types of distortions.

In some embodiments, the quadratic form generalization makes it possible for mathematical tools developed in the context of quadratic forms to be used in signal processing. For example, the solution set to the kernel of a quadratic form is an ellipsoid, hyperboloid, or paraboloid (depending on the eigen-spectrum of the quadratic form). This geometric structure may be exploited, in some applications, to achieve improved tracking and geolocation of a transmitting device (e.g., for tracking in ultra-wideband applications where proximity knowledge is important), for example as an enabling capability for a Kalman filter.

In some embodiments, methods described herein facilitate the generalization of a correlation to a quadratic form case. In other words, correlation—whether cross-correlation, auto-correlation, or any other type of correlation—between $\bar{v}$ and $\bar{w}$ may be performed using a linear transformation of one or both of the vectors $\bar{v}$ and $\bar{w}$, so that the correlation is of the form $$\text{corr}(\bar{v}, \bar{w}) \equiv \sum_{i,j=1}^{N} a_{ij} v_i^* w_j, \quad (16)$$

with or without the complex conjugate on one or both of the components of the vectors in question. In some implementations, the $a_{mn}$ values do not form the identity matrix.

FIG. 1 is a flowchart illustrating a method for performing a correlation between for a pair of vectors using a quadratic form, according to an embodiment. As shown in FIG. 1, the method 100 includes receiving, at 102, at a processor, a plurality of data values, and defining, at 104, via the processor and based on the plurality of data values, a first vector $\bar{v}$ and a second vector $\bar{w}$. A correlation between the first vector $\bar{v}$ and the second vector $\bar{w}$ is calculated at 106, via the processor, using a quadratic form. In some implementations, the correlation is calculated without the use of an identity matrix. The method 100 also includes causing transmission of a signal representing the correlation, at 108.

Additional details compatible with the present disclosure can be found in co-pending U.S. Patent Application Publication Number 2022/0255728, published Aug. 11, 2022 and titled "Automorphic Transformations of Real and Complex Signal Samples within a Transmitter or Receiver," the entire content of which is herein incorporate by reference in its entirety for all purposes. For example, a system for implementing methods described herein can include a processor operably coupled to a memory storing processor-executable instructions to receive a plurality of data values, decompose or subdivide the data values into two lists or vectors $\bar{v}$ and $\bar{w}$, and compute (e.g., calculate) a correlation between the lists v and w using a desired generalized quadratic form. In some implementations, the correlation is computed without the use of an identity matrix.

In some such implementations, the correlation is a cross correlation between different vectors from different signals. For example, a first vector can include (or be generated based on) a first subset of data values from a plurality of data values, and a second vector can include (or be generated based on) a second subset of data values from the plurality of data values. The first subset of data values may be different from, and mutually exclusive of, the second subset of data values, and the first subset of data values may be received via a first signal while the second subset of data values may be received via a second signal different from the first signal.

Alternatively or in addition, in some implementations, the correlation is an auto-correlation between different parts of the same signal. For example, a first vector can include (or be generated based on) a first subset of data values from a plurality of data values, and a second vector can include (or be generated based on) a second subset of data values from the plurality of data values. The first subset of data values may be different from, and mutually exclusive of, the second subset of data values, and both the first subset of data values and the second subset of data values may be received via a common signal.

Figure 2:
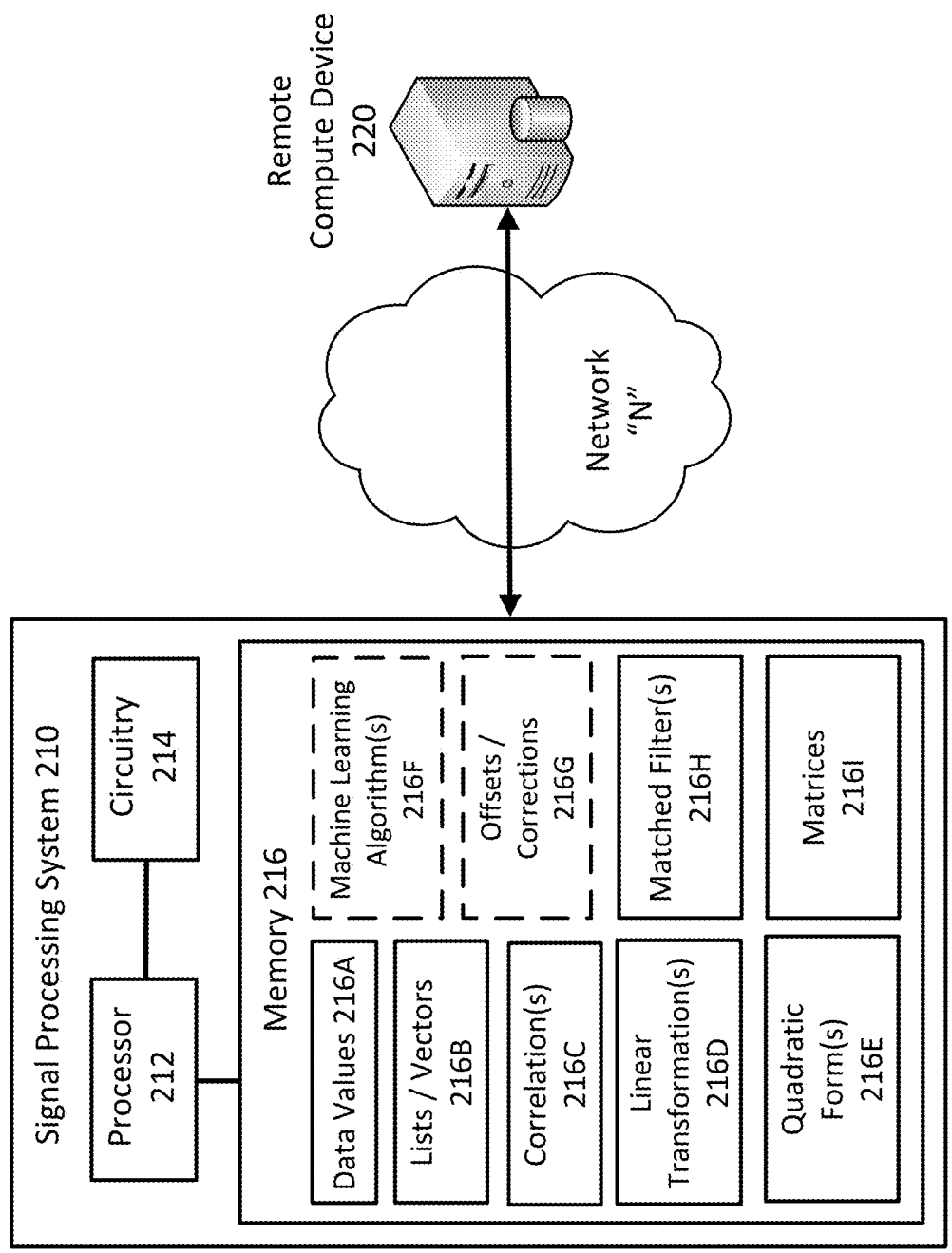
FIG. 2 is a diagram of a system for performing correlations using one or more quadratic forms, according to an embodiment.

FIG. 2 is a diagram of a system for performing correlations using one or more quadratic forms, according to an embodiment. The system of FIG. 2 can be configured to implement any of the method 100 of FIG. 1, the method 300 of FIG. 3, the method 400 of FIG. 4, and the method 500 of FIG. 5. As shown in FIG. 2, the system includes a signal processing system 210 (e.g., a communications receiver) in communication via a network "N" with a remote compute device 220. The network N can be a wired or wireless telecommunications network. The signal processing system 210 includes a processor operably coupled to circuitry 214 and a memory 216. The circuitry 214 can include, for example, a transceiver for sending and receiving signals representing data/messages. The memory 216 stores data values 216A, a set of lists/vectors 216B, correlations 216C, linear transformations 216D, and quadratic forms 216E. The memory 216 also optionally stores one or more machine learning algorithms 216F and/or a set of offsets and/or corrections 216G (e.g., carrier frequency offsets, time/frequency offsets, channel distortion corrections, noise corrections, interference rejection). During operation of the system of FIG. 2, data values 216A may be received at the correlator from the remote compute device 220 (e.g., sent via the network N), generated locally (i.e., within the signal processing system 210), and/or received via a local input at the signal processing system 210 (e.g., via a transceiver, a receiver, or an input/output device not shown). The memory 216 can also store instructions that are executable by the processor 212, for example to perform the method 100 of FIG. 1. The correlation performed by the system of FIG. 2 (e.g., by implementing the method 100 of FIG. 1) may be performed on received data/signals, on locally generated data/signals for transmission from the signal processing system 210 to a remote compute device (e.g., remote compute device 220), or both. In some implementations, the signal processing system 210 is part of a receiver, while in other implementations, the signal processing system 210 may be communicatively coupled to a receiver. In still other implementations, the functionality of the signal processing system 210 may be partially performed at a receiver, and partially performed at a compute device that is remote from (but communicatively coupled) the receiver. For example, signals may be received by a receiver and detected based on a trained ML model that is trained remotely from the receiver.

In some embodiments, a correlation may be applied as a linear, time-invariant operation. For example, the following sequence may be computed:

$$c_n = \sum_{i,j=1}^{N} a_{ij} v_{n-L+i}^* w_{n-K+j}, \quad (17)$$

where L and K are arbitrary offsets.

In some embodiments, the $a_{mn}$ values may change with time. In other embodiments, a correlation may be applied as a continuous operation, where the correlation may be computed as:

$$c(v,w) = \int_{-\infty}^{\infty} a(x,y) v^*(x) w(y). \quad (18)$$

As discussed above, and in any embodiment described herein, the complex conjugation can be on neither, one, or both of the two arguments. Correlations of the present disclosure can also be computed as a linear time invariant quantity that depends on the time argument of $v(x)$ and $w(x)$.

Figure 3:
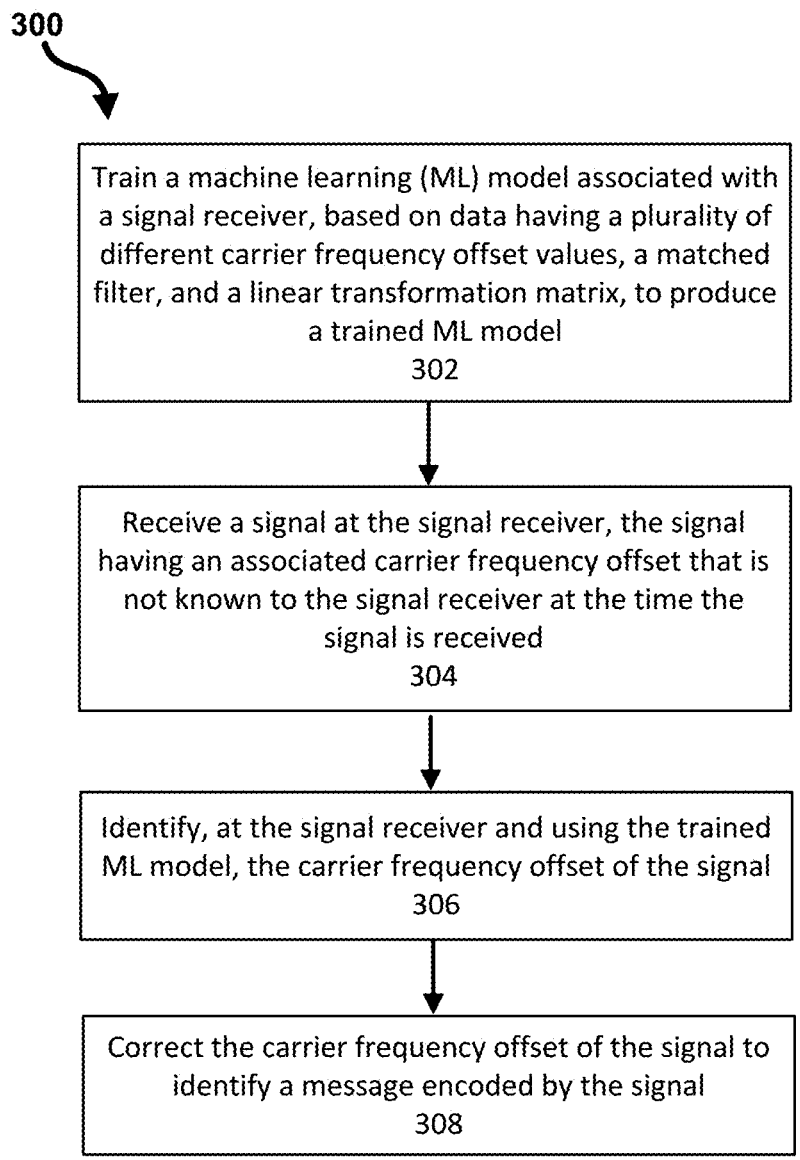
FIG. 3 is a flowchart illustrating a method for training a machine learning (ML) model to perform signal detection to correct a carrier frequency offset associated with a signal, according to an embodiment.

FIG. 3 is a flowchart illustrating a method 300 for training a machine learning (ML) model to perform signal detection to correct a carrier frequency offset associated with a signal, according to an embodiment. The method 300 can be implemented, for example, using the system of FIG. 2, for example as processor-executable instructions stored on a non-transitory, processor-readable medium. As shown in FIG. 3, the method 300 includes training a machine learning (ML) model associated with a receiver, at 302, based on (1) data including a plurality of different carrier frequency offset values, (2) a matched filter, and (3) a linear transformation matrix, to produce a trained ML model. At 304, a signal is received at the receiver, the signal having an associated carrier frequency offset that is not known to the receiver at the time the signal is received. The method 300 also includes identifying, at 306, at the receiver and using the trained ML model, the carrier frequency offset of the signal, and correcting the carrier frequency offset of the signal at 308 to identify a message encoded by the signal.

In some implementations, the training of the ML model at 302 is performed using a correlator defined as $a_{mn} = \delta_{mn}(e^{i\alpha})^m$ where $\delta_{mn}$ is a Kronecker delta, $a_{mn}$ are elements of the linear transformation matrix (which optionally is not an identity matrix), and a is a free parameter to be optimized. Alternatively or in addition, in some implementations, identifying the carrier frequency offset of the signal at 306 includes generating an estimate of the carrier frequency offset of the signal.

In some implementations, the training of the ML model at 302 is performed using a value defined as $D_\alpha \cdot z$, where $D_\alpha$ is defined as $e^{i\varphi} z^\dagger \cdot D_\theta \cdot \bar{z}$, z represents an in-phase/quadrature (I/Q) point, $z^\dagger$ represents a conjugate transpose of z, $D_\theta$ is an N×N diagonal unitary matrix with entries $e^{in\theta}$ for $n \in [0, N)$, N being an integer, and $\bar{z}$ represents a sequence of I/Q points.

In some implementations, the training of the ML model at 302 is performed in response to the signal being received at the receiver. Alternatively or in addition, the training of the ML model at 302 can be performed using a correlation having a quadratic form.

Figure 4:
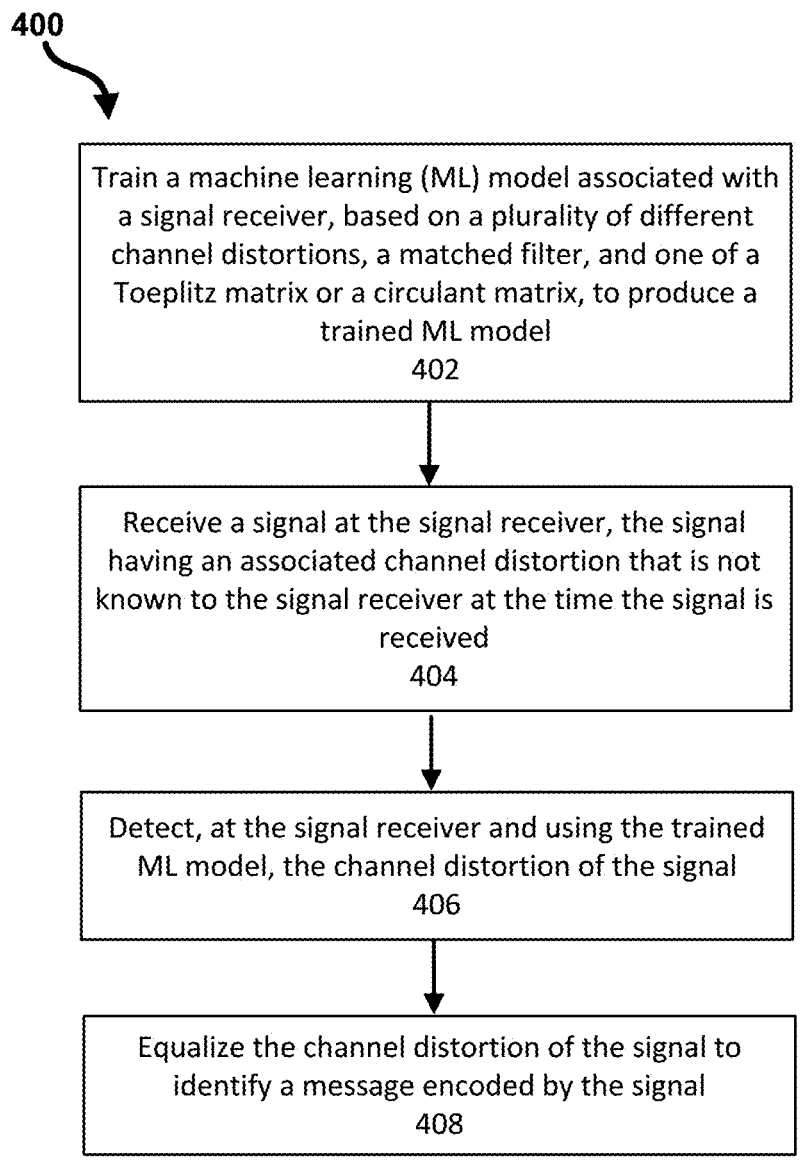
FIG. 4 is a flowchart illustrating a method for training a ML model to perform signal detection and to equalize channel distortion associated with a signal, according to an embodiment.

FIG. 4 is a flowchart illustrating a method for training a ML model to perform signal detection and to equalize channel distortion associated with a signal, according to an embodiment. The method 400 can be implemented, for example, using the system of FIG. 2, for example as processor-executable instructions stored on a non-transitory, processor-readable medium. As shown in FIG. 4, the method 400 includes training a machine learning (ML) model associated with a receiver, at 402, based on (1) a plurality of different channel distortions, (2) a matched filter, and (3) one of a Toeplitz matrix or a circulant matrix, to produce a trained ML model. The method 400 also includes receiving a signal at the receiver, at 304, the signal having an associated channel distortion that is not known to the receiver at the time the signal is received. At 406, the channel distortion of the signal is detected at the receiver, using the trained ML model, and at 408 the channel distortion of the signal is equalized such that a message encoded by the signal can be identified. The method optionally also includes selecting the matched filter in response to receiving the signal.

In some implementations, the method 400 also includes selecting the one of the Toeplitz matrix or the circulant matrix based on whether the signal includes a cyclic prefix. Alternatively or in addition, in some implementations, the matched filter is a first matched filter and the trained ML model is configured to identify a second matched filter different from the first matched filter and retraining the trained ML model based on the second matched filter (and, optionally, not based on the first matched filter).

In some implementations, the detecting the channel distortion includes performing one of cross-correlation or auto-correlation of portions of the signal. In other implementations, the detecting the channel distortion includes performing a correlation based on the signal, the correlation having a quadratic form. The quadratic form can take the following form: corr $$(\bar{v}, \bar{w}) \equiv \sum_{i,j=1}^{N} a_{ij} v_i^* w_j,$$

where $a_{ij}$ are elements of the one of the Toeplitz matrix or the circulant matrix, $v^*_i$ are elements of a first component of the signal, $w_j$ are elements of a second component of the signal different from the first component of the signal, and * denotes a complex conjugate.

Figure 5:
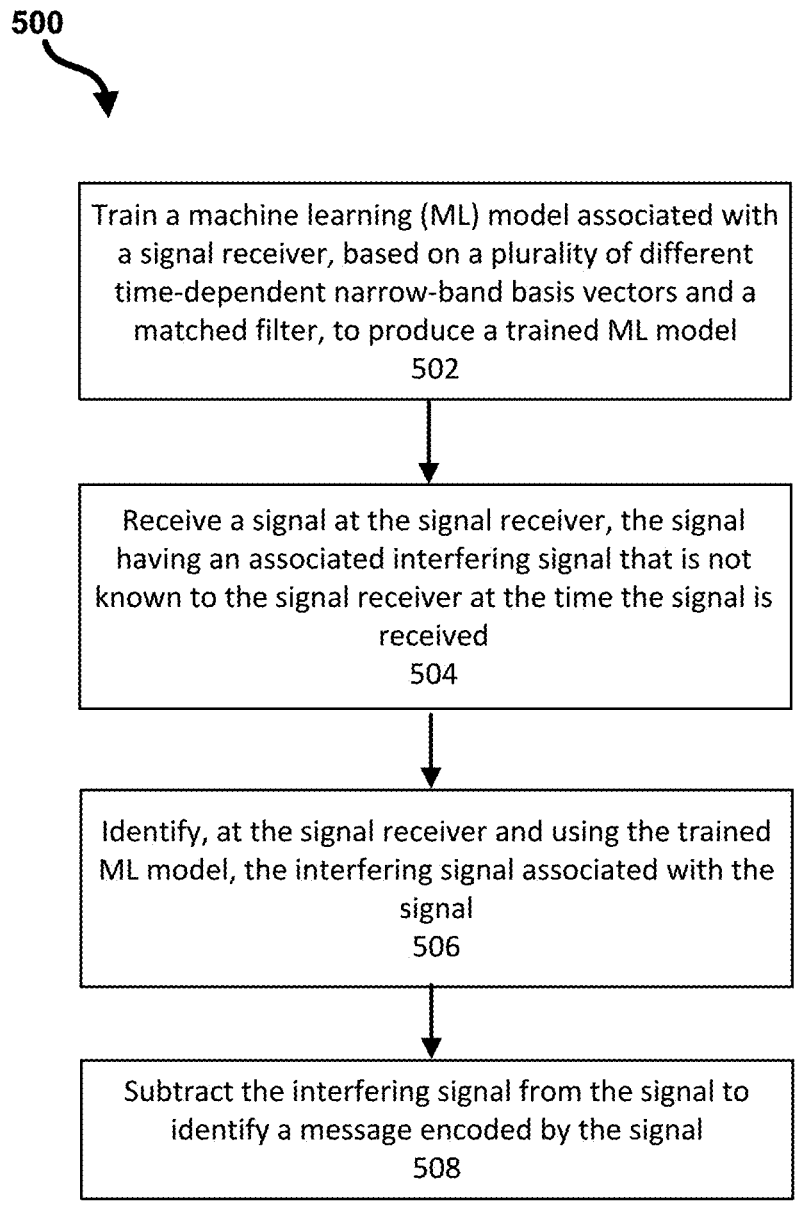
FIG. 5 is a flowchart illustrating a method for training a ML model to perform signal detection and to remove the effects of an interfering signal from a received signal, according to an embodiment.

FIG. 5 is a flowchart illustrating a method for training a ML model to perform signal detection and to remove the effects of an interfering signal from a received signal, according to an embodiment. The method 500 can be implemented, for example, using the system of FIG. 2, for example as processor-executable instructions stored on a non-transitory, processor-readable medium. As shown in FIG. 5, the method 500 includes training a machine learning (ML) model associated with a receiver, at 502, based on (1) a plurality of different time-dependent narrow-band basis vectors, and (2) a matched filter, to produce a trained ML model. At 504, a signal is received at the receiver, the signal having an associated interfering signal that is not known to the receiver at the time the signal is received. The interfering signal associated with the signal is identified, at 506, at the receiver and using the trained ML model, and the interfering signal is subtracted from the signal at 508 to identify a message encoded by the signal.

In some implementations, the plurality of different time-dependent narrow-band basis vectors is an element of a Shannon-Whittaker basis, and the trained ML model is configured to identify coefficients of a linear combination of elements of the Shannon-Whittaker basis. Alternatively or in addition, in some implementations, the interfering signal is a narrowband signal.

In some implementations, the identification of the interfering signal includes performing a correlation based on the signal, the correlation being a homogeneous polynomial (e.g., having a quadratic form) and not including an identity matrix. Implementations of the various techniques described herein may be implemented in digital electronic circuitry, or in computer hardware, firmware, software (executed or stored in hardware), or in combinations of them. Implementations may be implemented as a computer program product, i.e., a computer program tangibly embodied, e.g., in a machine-readable storage device (computer-readable medium, a non-transitory computer-readable storage medium, a tangible computer-readable storage medium, etc.), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A non-transitory, processor-readable medium storing instructions that, when executed by a processor, cause the processor to:
one of:
  train a machine learning (ML) model associated with a receiver, based on (1) data including a plurality of different carrier frequency offset values, (2) a matched filter, and (3) a linear transformation matrix, to produce a trained ML model, or
  receive the trained ML model from a remote compute device;
receive a signal at the receiver, the signal having an associated carrier frequency offset that is not known to the receiver at the time the signal is received;
identify, at the receiver and using the trained ML model, the carrier frequency offset of the signal; and
correct the carrier frequency offset of the signal to identify a message encoded by the signal.

2. The non-transitory, processor-readable medium of claim 1, wherein the instructions to cause the processor to train the ML model include instructions to train the ML model using a correlator defined as:

$$a_{mn} = \delta_{mn}(e^{i\alpha})^m,$$

where $\delta_{mn}$ is a Kronecker delta, $a_{mn}$ are elements of the linear transformation matrix, and a is a free parameter to be optimized.

3. The non-transitory, processor-readable medium of claim 2, wherein the linear transformation matrix is not an identity matrix.

4. The non-transitory, processor-readable medium of claim 1, wherein the instructions to cause the processor to identify the carrier frequency offset of the signal include instructions to estimate the carrier frequency offset of the signal.

5. The non-transitory, processor-readable medium of claim 1, wherein the instructions to cause the processor to train the ML model include instructions to train the ML model using a value defined as $D_\alpha \cdot z$, where $D_\alpha$ is defined as $\overline{e^{i\phi} z^\dagger} \cdot D_\theta \cdot \overline{z}$, z represents an in-phase/quadrature (I/Q) point, $z^\dagger$ represents a conjugate transpose of z, $D_\theta$ is an N×N diagonal unitary matrix with entries $e^{in\theta}$ for $n \in [0, N)$, N being an integer, and $\overline{z}$ represents a sequence of I/Q points.

6. The non-transitory, processor-readable medium of claim 1, wherein the instructions to cause the processor to train the ML model include instructions to train the ML model in response to the signal being received at the receiver.

7. The non-transitory, processor-readable medium of claim 1, wherein the instructions to cause the processor to train the ML model include instructions to train the ML model using a correlation having a quadratic form.

8. A method, comprising:
training a machine learning (ML) model associated with a receiver, based on (1) a plurality of different channel distortions, (2) a matched filter, and (3) one of a Toeplitz matrix or a circulant matrix, to produce a trained ML model;
receiving a signal at the receiver, the signal having an associated channel distortion that is not known to the receiver at the time the signal is received;
detecting, at the receiver and using the trained ML model, the channel distortion of the signal; and
equalizing the channel distortion of the signal to identify a message encoded by the signal.

9. The method of claim 8, further comprising selecting the one of the Toeplitz matrix or the circulant matrix based on whether the signal includes a cyclic prefix.

10. The method of claim 8, wherein the matched filter is a first matched filter and the trained ML model is configured to identify a second matched filter different from the first matched filter, and to retrain the trained ML model based on the second matched filter.

11. The method of claim 8, wherein the detecting the channel distortion includes performing one of cross-correlation or auto-correlation of portions of the signal.

12. The method of claim 8, wherein the detecting the channel distortion includes performing a correlation based on the signal, the correlation having a quadratic form.

13. The method of claim 12, wherein the quadratic form is:

$$\text{corr}(\overline{v}, \overline{w}) \equiv \sum_{i,j=1}^{N} a_{ij} v_i^* w_j,$$

where $a_{ij}$ are elements of the one of the Toeplitz matrix or the circulant matrix, vi are elements of a first component of the signal, $w_j$ are elements of a second component of the signal different from the first component of the signal, and * denotes a complex conjugate.

14. The method of claim 8, further comprising selecting the matched filter in response to receiving the signal.

15. A non-transitory, processor-readable medium storing instructions that, when executed by a processor, cause the processor to:
train a machine learning (ML) model associated with a receiver, based on (1) a plurality of different time-dependent narrow-band basis vectors, and (2) a matched filter, to produce a trained ML model;
receive a signal at the receiver, the signal having an associated interfering signal that is not known to the receiver at the time the signal is received;
identify, at the receiver and using the trained ML model, the interfering signal associated with the signal; and
subtract the interfering signal from the signal to identify a message encoded by the signal.

16. The non-transitory, processor-readable medium of claim 15, wherein each time-dependent narrow-band basis vector from the plurality of different time-dependent narrow-band basis vectors is an element of a Shannon-Whittaker basis.

17. The non-transitory, processor-readable medium of claim 16, wherein the trained ML model is configured to identify coefficients of a linear combination of elements of the Shannon-Whittaker basis.

18. The non-transitory, processor-readable medium of claim 15, wherein the interfering signal is a narrowband signal.

19. The non-transitory, processor-readable medium of claim 15, wherein the instructions to cause the processor to identify the interfering signal include instructions to perform a correlation based on the signal, the correlation having a quadratic form and not including an identity matrix.

20. The non-transitory, processor-readable medium of claim 19, wherein the quadratic form includes a homogeneous polynomial.

* * * * *